United States Patent
Gomi

(10) Patent No.: US 7,202,462 B2
(45) Date of Patent: Apr. 10, 2007

(54) SOLID-STATE IMAGING APPARATUS WITH REDUCED SHADING OF PIXEL SIGNALS

(75) Inventor: Yuichi Gomi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/146,137

(22) Filed: Jun. 7, 2005

(65) Prior Publication Data

US 2005/0269484 A1  Dec. 8, 2005

(30) Foreign Application Priority Data

Jun. 8, 2004  (JP) .............................. 2004-169559

(51) Int. Cl.
*H01L 27/00* (2006.01)
(52) U.S. Cl. ................... 250/208.1; 348/302
(58) Field of Classification Search ............ 250/208.1; 348/222.1, 302–303, 311, 316, 323
See application file for complete search history.

(56) References Cited

U.S. PATENT DOCUMENTS 6,784,931 B1 * 8/2004 Kudo ......................... 348/296
6,822,211 B2 * 11/2004 Hagihara ................. 250/208.1
6,903,768 B1 * 6/2005 Ohsawa et al. ............. 348/241

FOREIGN PATENT DOCUMENTS

| JP | 11-103418 A | | 4/1999 |
|---|---|---|---|
| JP | 11103418 A | * | 4/1999 |

* cited by examiner

*Primary Examiner*—Stephone B. Allen
*Assistant Examiner*—Patrick J. Lee
(74) *Attorney, Agent, or Firm*—Westerman, Hattori, Daniels & Adrian, LLP.

(57) ABSTRACT

Disclosed herein is a solid-state imaging apparatus including: a pixel section having a plurality of pixels arranged in a two-dimensional matrix, each containing an amplification means for amplifying signal of a photoelectric conversion device; horizontal and vertical read circuits for reading pixel signals in pixel units from the pixel section; and load means provided respectively at opposite locations with the pixel section between, the load means serving as one unit of load on the amplification means of each pixel arranged on each column line.

6 Claims, 5 Drawing Sheets

SOLID-STATE IMAGING APPARATUS WITH REDUCED SHADING OF PIXEL SIGNALS

This application claims benefit of Japanese Patent Application No. 2004-169559 filed in Japan on Jun. 8, 2004, the contents of which are incorporated by this reference.

BACKGROUND OF THE INVENTION

The present invention relates to solid-state imaging apparatus in which shading of pixel signals outputted from the pixels arranged in a two-dimensional matrix can be reduced.

One as shown in FIG. 1, for example, is known as a solid-state imaging apparatus having pixels containing an amplification means for amplifying signals of photoelectric conversion device.

Referring to FIG. 1, numeral 100 denotes pixels where an example of pixel array of 3 columns by 3 rows is shown. A pixel region 150 is formed of this pixel array. Each pixel 100 consists of one photodiode serving as photoelectric conversion device and three MOS transistors. A photodiode 1 is connected to the source of a reset MOS transistor 2 having its gate connected in common along each row and is connected to the gate of an amplifying MOS transistor 3. The gates of the reset MOS transistors 2 connected in common by each row are connected to a vertical scanning circuit 30.

The drains of both reset MOS transistor 2 and amplifying MOS transistor 3 are connected to a power supply line 5 which is provided for each column. The power supply line 5 provided for each column is connected to a power supply terminal 7 through a common power supply line 6. The source of the amplifying MOS transistor 3 is connected to the drain of a row select MOS transistor 4 of which gate is connected in common by each row. The commonly connected gates of the row select MOS transistors 4 are connected to the vertical scanning circuit 30. The source of the row select MOS transistor 4 is connected in common along each column to a vertical signal line 10 so that the pixels 100 in each column are linked to each other by the vertical signal line 10.

Each vertical signal line 10 is connected to a load current source 11 which forms a source follower circuit together with the amplifying MOS transistor 3 within pixel. A signal voltage generated at the photodiode 1 of each pixel is to be read out after current amplification at the source follower circuit. The output signals of the source follower circuit are outputted to an external section by an output terminal OUT through the vertical signal lines 10, horizontal select MOS transistors 12, a horizontal signal output line 13, and an output amplifier 14. The gates of the horizontal select MOS transistors 12 are connected to a horizontal scanning circuit 20. Here a horizontal read circuit 200 is constructed by the horizontal select MOS transistors 12, horizontal signal output line 13, output amplifier 14, and horizontal scanning circuit 20.

In thus constructed solid-state imaging apparatus, photodiode 1 is reset-row by row to the level of the power supply and is caused to accumulate charge corresponding to an incident light amount by controlling row by row the reset MOS transistor 2 and row select MOS transistor 4 based on a signal from the vertical scanning circuit 30. A signal voltage due to such accumulated charge occurs row by row on each vertical signal line 10 as amplified by the source follower circuit and is outputted from the output amplifier 14 by sequentially controlling ON/OFF of the horizontal select MOS transistor 12 by means of the horizontal scanning circuit 20.

Further, FIG. 2 is a circuit diagram of solid-state imaging apparatus as disclosed in Japanese Patent Application Laid-Open Hei-11-103418. In this solid-state imaging apparatus, horizontal read circuits are provided on upper and lower sides of the pixel region and each horizontal circuit is connected to vertical signal lines of every other column. Here, like components as those in the solid-state imaging apparatus shown in FIG. 1 are denoted by like reference numerals. Referring to FIG. 2, numeral 100 denotes pixels where an example of pixel array of 4 columns by 3 rows is shown. A pixel region 150 is thereby formed. Each pixel 100 consists of one photodiode serving as photoelectric conversion device and three MOS transistors.

A photodiode 1 is connected to the source of a reset MOS transistor 2 having its gate connected in common along each row and is connected to the gate of an amplifying MOS transistor 3. The gate of the reset MOS transistor 2 connected in common by each row is connected to a vertical scanning circuit 30. The drains of both reset MOS transistor 2 and amplifying MOS transistor 3 are connected to a power supply line 5 which is provided for each column. The power supply line 5 provided for each column is connected to a power supply terminal 7 through a common power supply line 6.

The source of the amplifying MOS transistor 3 is connected to the drain of a row select MOS transistor 4 of which gate is connected in common by each row. The commonly connected gates of the row select MOS transistors 4 are connected to the vertical scanning circuit 30. The sources of the row select MOS transistors 4 are connected in common along each column to a vertical signal line 10 so that the pixels 100 in each column are linked to each other by the vertical signal line 10. Each vertical signal line 10 is connected to a load current source 11 which forms a source follower circuit together with the amplifying MOS transistor 3 within pixel. A signal voltage generated at the photodiode 1 of each pixel is to be read out after current amplification at the source follower circuit.

The pixel signals, which will become output signals of the source follower circuit, are read out using a first horizontal read circuit 200-1 and second horizontal read circuit 200-2 each connected to the vertical signal lines of every other column. The output signals of the source follower circuit of the pixel columns connected to the first horizontal read circuit 200-1 are outputted to an external section from an output terminal OUT1 through the vertical signal line 10, a horizontal select MOS transistor 12-1, a horizontal signal output line 13-1, and an output amplifier 14-1. The gates of the horizontal select MOS transistors 12-1 are connected to a first horizontal scanning circuit 20-1. Here, the first horizontal read circuit 200-1 is constructed by the horizontal select MOS transistors 12-1, horizontal signal output line 13-1, output amplifier 14-1, and the first horizontal scanning circuit 20-1.

Further, the output signals of the source follower circuit of the pixel columns connected to the second horizontal read circuit 200-2 are outputted to an external section from an output terminal OUT2 through the vertical signal line 10, a horizontal select MOS transistor 12-2, a horizontal signal output line 13-2, and an output amplifier 14-2. The gates of the horizontal select MOS transistors 12-2 are connected to a second horizontal scanning circuit 20-2. Here, the second horizontal read circuit 200-2 is constructed by the horizontal select MOS transistors 12-2, horizontal signal output line 13-2, output amplifier 14-2, and the second horizontal scanning circuit 20-2.

In thus constructed solid-state imaging apparatus, photodiode 1 is reset row by row to the level of the power supply and is caused to accumulate charge corresponding to an incident light amount by controlling row by row the reset MOS transistor 2 and row select MOS transistor 4 based on a signal from the vertical scanning circuit 30. A signal voltage due to such accumulated charge occurs row by row on each vertical signal line 10 as amplified by the source follower circuit and is outputted from the output amplifiers 14-1 and 14-2 by sequentially controlling ON/OFF of the horizontal select MOS transistors 12-1 and 12-2 of the first and second horizontal read circuits 200-1 and 200-2 by means of the first and second horizontal scanning circuits 20-1 and 20-2.

SUMMARY OF THE INVENTION

It is an object of the present invention to provide a solid-state imaging apparatus in which shading of pixel signals from pixels arranged in a two-dimensional matrix can be reduced.

In a first aspect of the invention, a solid-state imaging apparatus includes: a pixel section having a plurality of pixels arranged in a two-dimensional matrix, each containing an amplification means for amplifying signal of a photoelectric conversion device; horizontal and vertical read circuits. for reading pixel signals in pixel units from the pixel section; and load means respectively provided at opposite locations with the pixel section between, the load means serving as one unit of load on the amplification means of each pixel arranged on each column line.

In a second aspect of the invention, the solid-state imaging apparatus according to the first aspect further includes: a plurality of power supply lines for supplying power commonly to the amplification means of each pixel arranged on each column line; and common power supply lines connected in common respectively to the two ends of each power supply line.

In a third aspect of the invention, the horizontal read circuit in the solid-state imaging apparatus according to the first aspect is provided respectively in the vicinity of two opposite sides of the pixel section.

In a fourth aspect of the invention, the horizontal read circuit in the solid-state imaging apparatus according to the second aspect is provided respectively in the vicinity of two opposite sides of the pixel section.

In a fifth aspect of the invention, the load means and the horizontal read circuits in the solid-state imaging apparatus according to the third aspect are placed and laid out substantially symmetrically with the pixel section between.

In a sixth aspect of the invention, the load means, the common power supply lines, and the horizontal read circuits in the solid-state imaging apparatus according to the fourth aspect are placed and laid out substantially symmetrically with the pixel section between.

DESCRIPTION OF THE PREFERRED EMBODIMENT

Some embodiments of the present invention will be described below with reference to the drawings.

(Embodiment 1)

Figure 1:
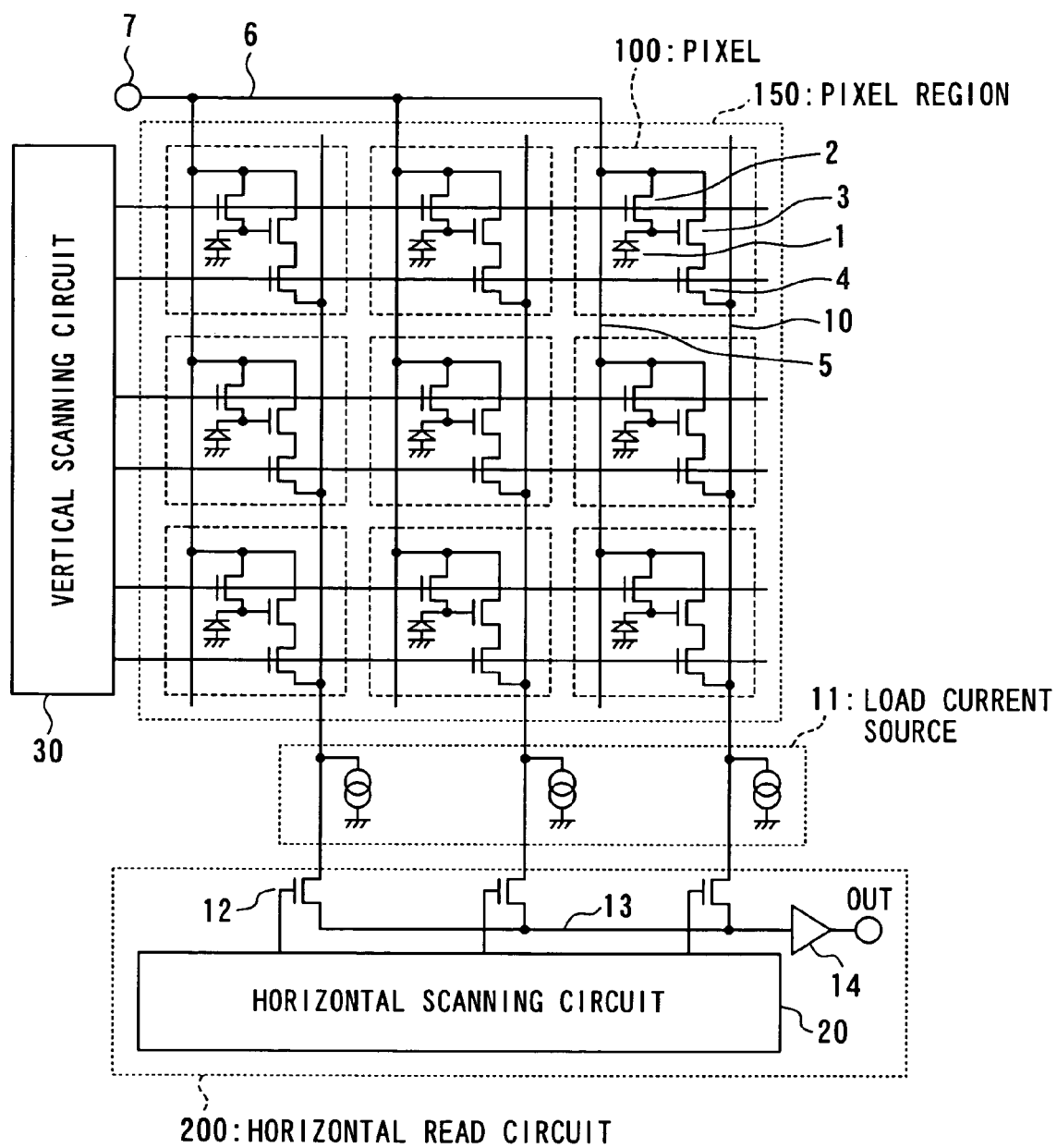
FIG. 1 is a circuit diagram showing an example of construction of conventional solid-state imaging apparatus.
Figure 2:
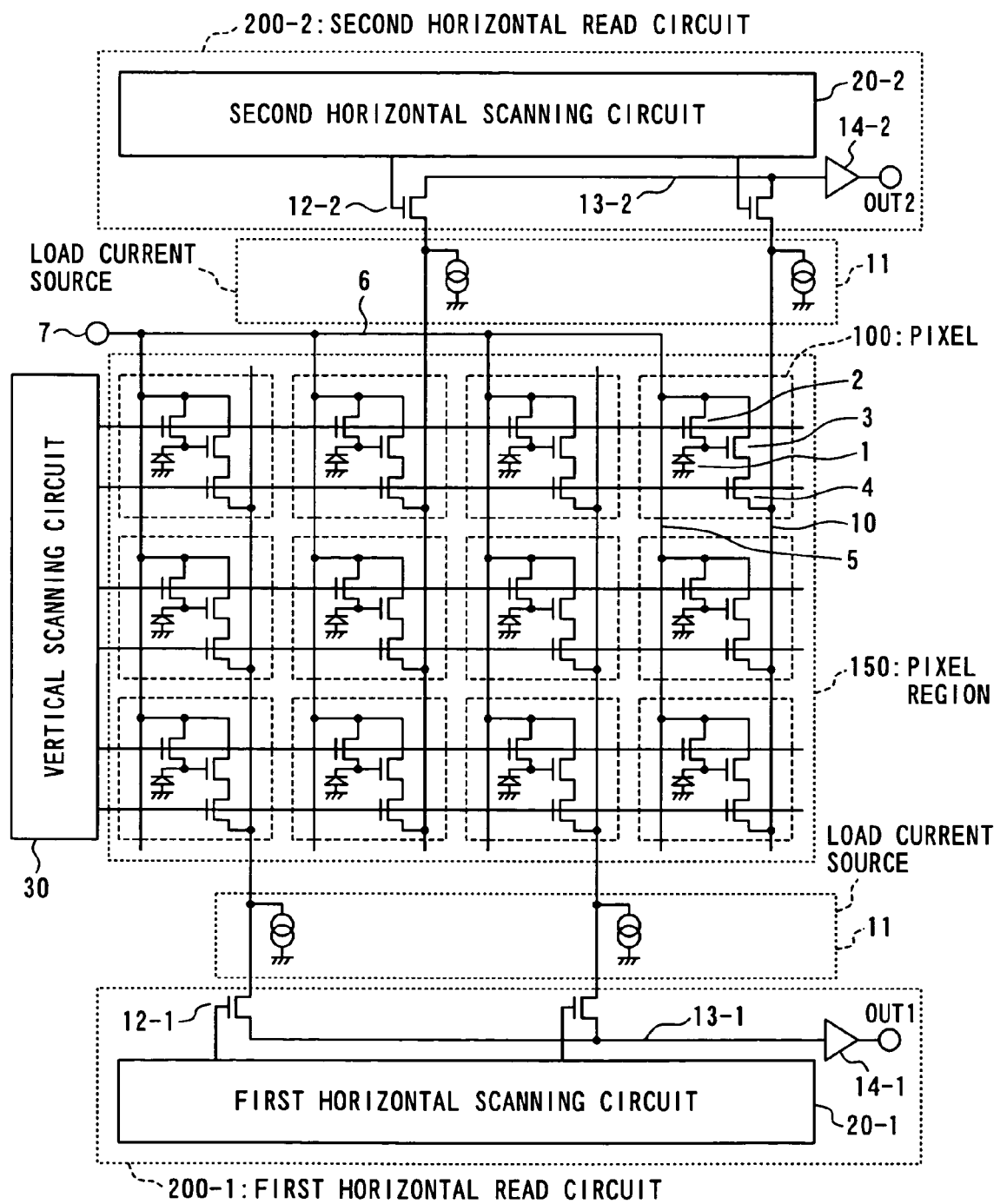
FIG. 2 is a circuit diagram showing another example of construction of conventional solid-state imaging apparatus.
Figure 3:
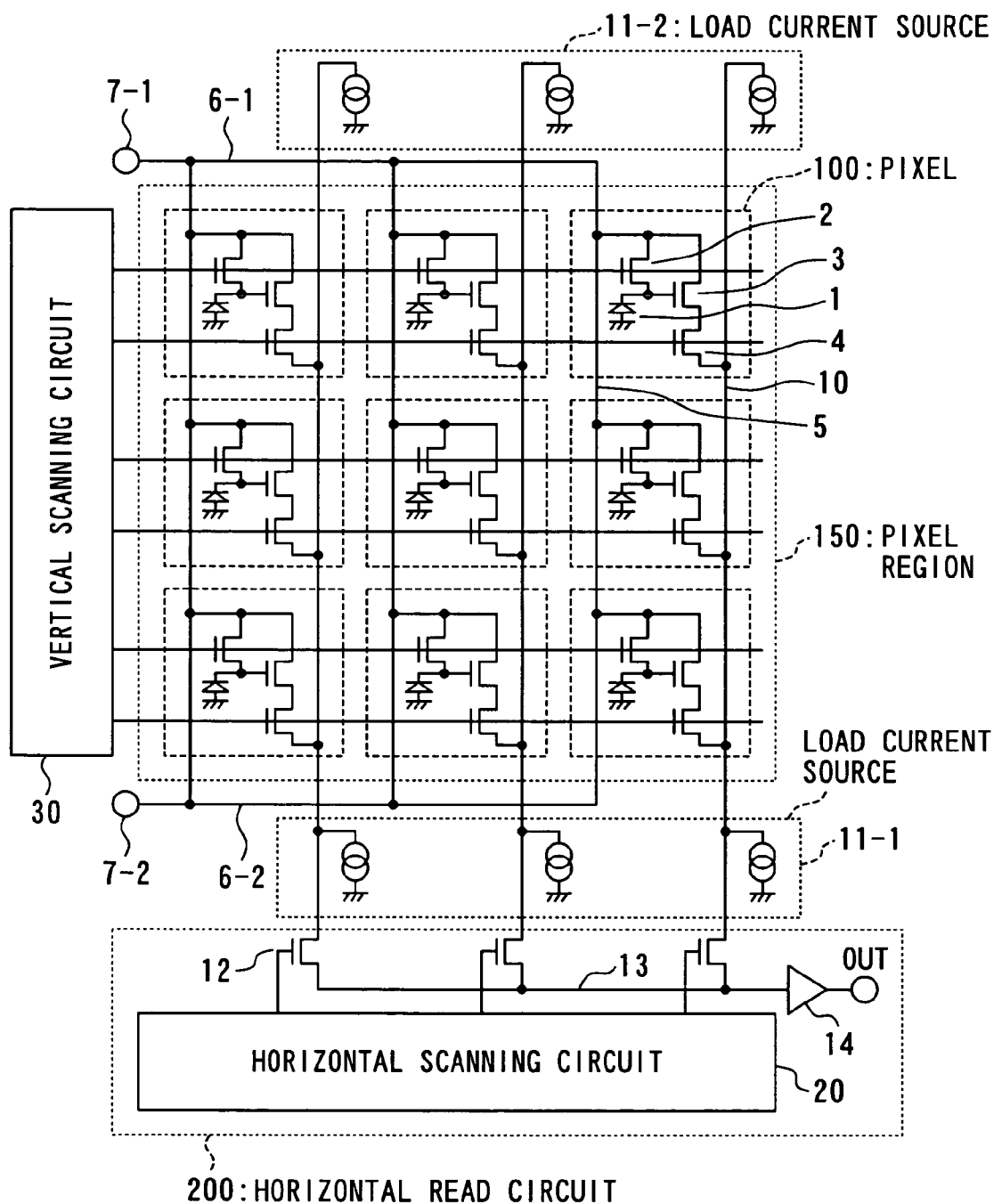
FIG. 3 is a circuit diagram showing a first embodiment of the solid-state imaging apparatus according to the invention.

A first embodiment will now be described. FIG. 3 is a circuit diagram showing the first embodiment of the solid-state imaging apparatus according to the invention. Referring to FIG. 3, numeral 100 denotes pixels where an example of pixel array of 3 columns by 3 rows is shown. A pixel region (pixel section) 150 is formed of this pixel array. Each pixel 100 consists of one photodiode serving as a photoelectric conversion device and three MOS transistors.

A photodiode 1 is connected to the source of a reset MOS transistor 2 having its gate connected in common along each row and is connected to the gate of an amplifying MOS transistor 3. The gates of the reset MOS transistors 2 are connected in common along each row and are connected to a vertical scanning circuit 30. The drains of both reset MOS transistor 2 and amplifying MOS transistor 3 are connected to a power supply line 5 which is provided for each column. The power supply line 5 provided for each column is respectively connected to power supply terminals 7-1 and 7-2 through common power supply lines 6-1 and 6-2 that are provided on an upper and lower sides of the pixel region 150. The source of the amplifying MOS transistor 3 is connected to the drain of a row select MOS transistor 4 of which gate is connected in common by each row. The commonly connected gates of the row select MOS transistors 4 are connected to the vertical scanning circuit 30. The sources of the row select MOS transistors 4 are connected in common along each column to a vertical signal line 10 so that the pixels 100 in each column are linked to each other by the vertical signal line 10.

For the vertical signal line 10, two load current sources 11-1 and 11-2, which form a source follower circuit together with the amplifying MOS transistor 3 within pixel, are provided at two locations, i.e., on the upper and lower sides of the pixel region 150, respectively. A signal voltage generated at the photodiode 1 of each pixel is to be read out after current amplification at the source follower circuit. The output signals of the source follower circuit are outputted to an external section by an output terminal OUT through the vertical signal lines 10, horizontal select MOS transistors 12, a horizontal signal output line 13, and an output amplifier 14. The gates of the horizontal select MOS transistors 12 are connected to a horizontal scanning circuit 20. Here a horizontal read circuit 200 is constructed by the horizontal select MOS transistors 12, horizontal signal output line 13, output amplifier 14, and horizontal scanning circuit 20.

In thus constructed solid-state imaging apparatus, photodiode 1 is reset row by row to the level of the power supply and is caused to accumulate charge corresponding to an incident light amount by controlling row by row the reset MOS transistor 2 and row select MOS transistor 4 based on a signal from the vertical scanning circuit 30. A signal voltage due to such accumulated charge occurs row by row on each vertical signal line 10 as amplified by the source follower circuit and is outputted from the output amplifier 14 by sequentially controlling ON/OFF of the horizontal select MOS transistors 12 by means of the horizontal scanning circuit 20.

In this embodiment as shown in FIG. 3, it is possible to reduce the current to be caused to flow through each load current source to about half as compared to the prior-art example, since the load current sources 11-1, 11-2 serving as load means provided for each column are provided at the upper and lower two locations, respectively, of the pixel region 150 along the row direction. The fall of potential due to parasitic resistance of the vertical signal line 10 thus becomes half so that it is possible to achieve a solid-state imaging apparatus where vertical shading of the pixel signals is reduced.

Further, since the common power supply lines 6-1, 6-2 to which the power supply lines 5 provided for each column are connected in common, are provided at the upper and lower two locations of the pixel region 150 along the row direction, the current is to be supplied from an upper and lower two directions. An actual parasitic resistance of the power supply line 5 provided for each column can thus be reduced to as less as about half of the prior-art example so that it is possible to achieve a solid-state imaging apparatus where vertical shading of the pixel signals is reduced. Furthermore, the load current sources 11-1, 11-2 provided on the upper and lower sides of the pixel region 150, and the common power supply lines 6-1, 6-2 to which the power supply lines 5 provided for each column to supply power to the amplifying section of pixel are connected in common are placed and laid out symmetrically in the up and down direction with respect to the pixel region 150. The manner of adding parasitic devices at the outside of the pixel region thus becomes substantially identical between the upper and lower sides of the pixel region 150 so that shading due to the effect thereof does not occur. It should be noted that the power supply terminals 7-1 and 7-2 may either be provided in common within a chip on which the solid-state imaging apparatus is formed or be brought to the outside in a manner respectively connected to separate pads.

The details of construction of the solid-state imaging apparatus are not limited to what has been shown in the present embodiment, and it is obvious that the load connecting construction and power supplying construction of the present embodiment can be applied to those solid-state imaging apparatus having an amplifying device in pixel and having a load device in each column line. The source follower circuit in the present embodiment has been shown as but not limited to one using a constant-current type load, and those using a resistor type load can also be used to obtain a similar advantage. Further, the horizontal read circuit in the present embodiment has been shown as but not limited to one constituted by the horizontal select MOS transistors, horizontal signal output line, output amplifier and horizontal scanning circuit, and it is naturally also possible to obtain a similar advantage by applying it to those having a horizontal read circuit which for example additionally includes an internally provided FPN cancel circuit.

(Embodiment 2)

Figure 4:
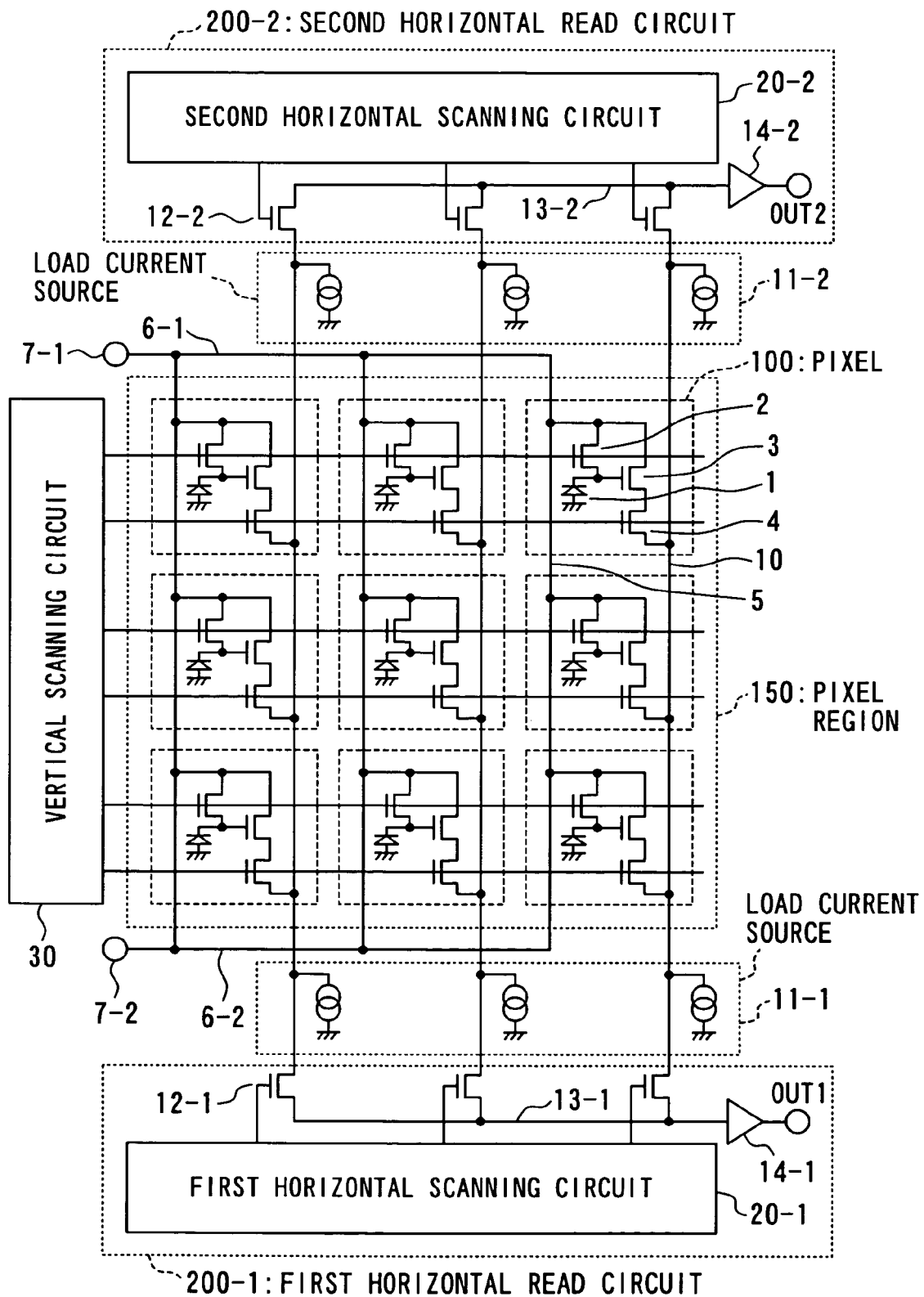
FIG. 4 is a circuit diagram showing construction of solid-state imaging apparatus according to a second embodiment of the invention.

A second embodiment will now be described. FIG. 4 is a circuit diagram showing a solid-state imaging apparatus according to the second embodiment where like components as in the solid-state imaging apparatus according to the first embodiment shown in FIG. 3 are denoted by like reference numerals. In the present embodiment, horizontal read circuits are provided on an upper and lower sides of the pixel region. Referring to FIG. 4, numeral 100 denotes pixels where an example of pixel array of 3 columns by 3 rows is shown. A pixel region 150 is formed of this pixel array. Each pixel consists of one photodiode serving as a photoelectric conversion device and three MOS transistors.

A photodiode 1 is connected to the source of a reset MOS transistor 2 having its gate connected in common along each row and is connected to the gate of an amplifying MOS transistor 3. The gates of the reset MOS transistors 2 are connected in common by each row and are connected to a vertical scanning circuit 30. The drains of both reset MOS transistor 2 and amplifying MOS transistor 3 are connected to a power supply line 5 which is provided for each column. The power supply line 5 provided for each column is respectively connected to power supply terminals 7-1 and 7-2 through common power supply lines 6-1 and 6-2 that are provided on an upper and lower sides of the pixel region 150. The source of the amplifying MOS transistor 3 is connected to the drain of a row select MOS transistor 4 of which gate is connected in common by each row. The commonly connected gates of the row select MOS transistors 4 are connected to the vertical scanning circuit 30. The sources of the row select MOS transistors 4 are connected in common along each column to a vertical signal line 10 so that the pixels 100 in each column are linked to each other by the vertical signal line 10.

For the vertical signal line 10, two load current sources 11-1 and 11-2, which form a source follower circuit together with the amplifying MOS transistor 3 within pixel, are provided at two locations, i.e., on the upper and lower sides of the pixel region 150, respectively. A signal voltage generated at the photodiode 1 of each pixel is to be read out after current amplification at the source follower circuit. The pixel signals, which will become output signals of the source follower circuit, are to be read out by using a first horizontal read circuit 200-1 or a second horizontal read circuit 200-2. In the solid-state imaging apparatus thus provided with the first and second horizontal read circuits, such merits as easiness in effecting color processing at a subsequent stage are obtained if it is applied to a color imaging apparatus, since for example the pixel signals can be read out row by row from the first or second horizontal read circuit.

In the case where the first horizontal read circuit 200-1 is used, the output signals of the source follower circuit are outputted to an external section from a first output terminal OUT1 through the vertical signal lines 10, horizontal select MOS transistors 12-1, horizontal signal output line 13-1, and output amplifier 14-1. The gates of the horizontal select MOS transistors 12-1 are connected to a first horizontal scanning circuit 20-1. Here the first horizontal read circuit 200-1 is constructed by the horizontal select MOS transistors 12-1, horizontal signal output line 13-1, output amplifier 14-1, and the first horizontal scanning circuit 20-1.

Further, in the case where the second horizontal read circuit 200-2 is used, the output signals of the source follower circuit are outputted to an external section from a second output terminal OUT2 through the vertical signal lines 10, horizontal select MOS transistors 12-2, horizontal signal output line 13-2, and output amplifier 14-2. The gates of the horizontal select MOS transistors 12-2 are connected to a second horizontal scanning circuit 20-2. Here the second horizontal read circuit 200-2 is constructed by the horizontal select MOS transistors 12-2, horizontal signal output line 13-2, output amplifier 14-2, and the second horizontal scanning circuit 20-2.

In thus constructed solid-state imaging apparatus, photodiode 1 is reset row by row to the level of the power supply and is caused to accumulate charge corresponding to an incident light amount by controlling row by row the reset MOS transistor 2 and row select MOS transistor 4 based on a signal from the vertical scanning circuit 30. A signal voltage due to such accumulated charge occurs row by row on each vertical signal line 10 as amplified by the source follower circuit and is outputted from the output terminal OUT1 or OUT2 through the output amplifier 14-1 or 14-2 by sequentially controlling ON/OFF of the horizontal select MOS transistors 12-1 or 12-2 of the first or second horizontal read circuit 200-1, 200-2 by means of the first or second horizontal scanning circuit 20-1 or 20-2.

As shown in FIG. 4, it is possible to reduce the current to be caused to flow through the load current source to about half as compared to the prior-art example, since the load current. sources 11-1 and 11-2 serving as load means provided for each column are provided at the upper and lower two locations, respectively, of the pixel region 150 along the row direction. The fall of potential due to parasitic resistance of the vertical signal line 10 thereby becomes half so that it is possible to achieve a solid-state imaging apparatus where vertical shading of the pixel signals is reduced. Further, since the common power supply lines 6-1, 6-2 to which the power supply lines 5 provided for each column are connected in common, are provided at the upper and lower two locations of the pixel region 150 along the row direction, the current is to be supplied from an upper and lower two directions. An actual parasitic resistance of the power supply line 5 provided for each column can thus be reduced to as less as about half of the prior-art example so that it is possible to achieve a solid-state imaging apparatus where vertical shading of the pixel signals is reduced.

Furthermore, the load current sources 11-1, 11-2 serving as the load means provided on the upper and lower sides of the pixel region 150, and the common power supply lines 6-1, 6-2 to which the power supply lines 5 provided for each column to supply power to the amplifying section of pixel are connected in common are placed and laid out symmetrically in the up and down direction with respect to the pixel region 150. The manner of adding parasitic devices at the outside of the pixel region 150 thus becomes substantially identical between the upper and lower sides of the pixel region 150 so that shading due to the effect thereof does not occur. It should be noted that the power supply terminals 7-1 and 7-2 may either be commonly provided within a chip on which the solid-state imaging apparatus is formed or be respectively connected to separate pads so as to be brought to the outside. The details of construction of the solid-state imaging apparatus are not limited to what has been shown in the present embodiment, and the construction of the present embodiment can obviously be applied to those solid-state imaging apparatus where an amplifying device is used in pixel and a load device is provided for each column line.

The construction of the source follower circuit in the present embodiment has been shown as but not limited to one using a constant-current type load, and it can also be applied to those using a resistor type load to obtain a similar advantage. Further, construction of the horizontal read circuit in the present embodiment has been shown as but not limited to one having the horizontal select MOS transistors, horizontal signal output line, output amplifier and horizontal scanning circuit, and a similar advantage can naturally also be obtained by applying it to those having a horizontal read circuit where for example FPN cancel circuit is internally provided. Furthermore, if a memory corresponding to one line is internally provided within each of the first and second horizontal read circuits, it is also possible to increase the speed of reading, since pixel signals corresponding to two lines stored therein can be concurrently read out.

(Embodiment 3)

Figure 5:
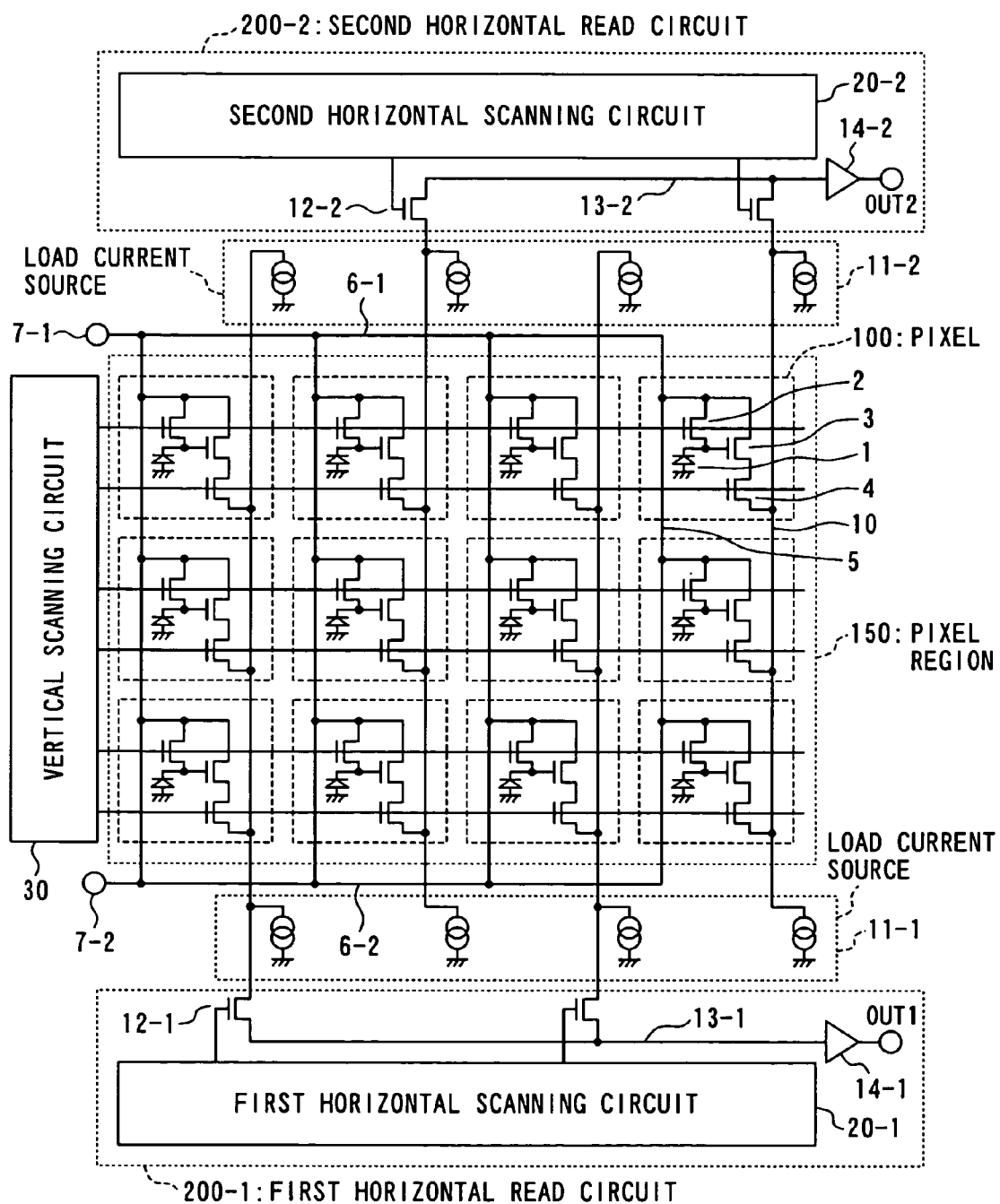
FIG. 5 is a circuit diagram showing construction of solid-state imaging apparatus according to a third embodiment of the invention.

A third embodiment will now be described. FIG. 5 is a circuit diagram showing construction of a solid-state imaging apparatus according to the third embodiment where like components as in the solid-state imaging apparatus according to the second embodiment shown in FIG. 4 are denoted by like reference numerals. In the present embodiment, horizontal read circuits are provided similarly to the second embodiment on an upper and lower sides of the pixel region. Referring to FIG. 5, numeral 100 denotes pixels where an example of pixel array of 4 columns by 3 rows is shown. A pixel region 150 is formed of this pixel array. Each pixel consists of one photodiode serving as a photoelectric conversion device and three MOS transistors.

A photodiode 1 is connected to the source of a reset MOS transistor 2 having its gate connected in common along each row and is connected to the gate of an amplifying MOS transistor 3. The gates of the reset MOS transistors 2 are connected in common by each row and are connected to a vertical scanning circuit 30. The drains of both reset MOS transistor 2 and amplifying MOS transistor 3 are connected to a power supply line 5 which is provided for each column.

The power supply line 5 provided for each column is respectively connected to power supply terminals 7-1 and 7-2 through common power supply lines 6-1 and 6-2 provided on an upper and lower sides of the pixel region 150. The source of the amplifying MOS transistor 3 is connected to the drain of a row select MOS transistor 4 of which gate is connected in common by each row. The commonly connected gates of the row select MOS transistors 4 are connected to the vertical scanning circuit 30. The sources of the row select MOS transistors 4 are connected in common along each column to a vertical signal line 10 so that the pixels 100 in each column are linked to each other by the vertical signal line 10.

For the vertical signal line 10, two load current sources 11-1 and 11-2, which form a source follower circuit together with the amplifying MOS transistor 3 within pixel, are provided at two locations, i.e., on the upper and lower sides of the pixel region 150, respectively. A signal voltage generated at the photodiode 1 of each pixel is to be read out after current amplification at the source follower circuit. The pixel signals, which will become output signals of the source follower circuit, are read out by using a first horizontal read circuit 200-1 and second horizontal read circuit 200-2 that are respectively connected to the vertical signal lines 10 of every other column. In the solid-state imaging apparatus where the first and second horizontal read circuits 200-1, 200-2 are connected to the vertical signal lines of every other column, since the outputting of two columns at a time is possible by the first and second horizontal read circuits 200-1, 200-2, an increase in the speed of reading can be achieved. Further, since the circuit pitch of the first and second read circuits 200-1, 200-2 becomes two times the pixel pitch, there is also a merit that layout thereof is easy.

The output signals of the source follower circuit of the pixel columns connected to the first horizontal read circuit 200-1 are outputted to an external section from a first output terminal OUT1 through the vertical signal lines 10, horizontal select MOS transistors 12-1, horizontal signal output line 13-1, and output amplifier 14-1. The gates of the horizontal select MOS transistors 12-1 are connected to a first horizontal scanning circuit 20-1. Here the first horizontal read circuit 200-1 is constructed by the horizontal select MOS transistors 12-1, horizontal signal output line 13-1, output amplifier 14-1, and the first horizontal scanning circuit 20-1.

Further, the output signals of the source follower circuit of the pixel columns connected to the second horizontal read circuit 200-2 are outputted to an external section from a second output terminal OUT2 through the vertical signal lines 10, horizontal select MOS transistors 12-2, horizontal signal output line 13-2, and output amplifier 14-2. The gates of the horizontal select MOS transistors 12-2 are connected to a second horizontal scanning circuit 20-2. Here the second horizontal read circuit 200-2 is constructed by the horizontal select MOS transistors 12-2, horizontal signal output line 13-2, output amplifier 14-2, and the second horizontal scanning circuit 20-2.

In thus constructed solid-state imaging apparatus, photodiode 1 is reset row by row to the level of the power supply and is caused to accumulate charge corresponding to an incident light amount by controlling row by row the reset MOS transistor 2 and row select MOS transistor 4 based on a signal from the vertical scanning circuit 30. A signal voltage based on such accumulated charge occurs row by row on each vertical signal line 10 as amplified by the source follower circuit and is outputted from the first and second output terminals OUT1 and OUT2 through the output amplifiers 14-1 and 14-2 by sequentially controlling ON/OFF of the horizontal select MOS transistors 12-1 and 12-2 of the first and second horizontal read circuits 200-1, 200-2 by means of the first and second horizontal scanning circuits 20-1 and 20-2.

As shown in FIG. 5, it is possible to reduce the current to be caused to flow through the load current source to about half as compared to the prior-art example, since the load current sources 11-1 and 11-2 serving as load means provided for each column are provided at the upper and lower two locations, respectively, of the pixel region 150 along the row direction. The fall of potential due to parasitic resistance of the vertical signal line 10 thereby becomes half so that it is possible to achieve a solid-state imaging apparatus where vertical shading of the pixel signals is reduced. Further, since the common power supply lines 6-1, 6-2 to which the power supply lines 5 provided for each column are connected in common, are provided at the upper and lower two locations of the pixel region 150 along the row direction, the current is to be supplied from an upper and lower two directions. An actual parasitic resistance of the power supply line 5 provided for each column can thus be reduced to as less as about half of the prior-art example so that it is possible to achieve a solid-state imaging apparatus where vertical shading of the pixel signals is reduced.

Furthermore, the load current sources 11-1, 11-2 serving as the load means provided on the upper and lower sides of the pixel region 150, and the common power supply lines 6-1, 6-2 to which the power supply lines 5 provided for each column to supply power to the amplifying section of pixel are connected in common are placed and laid out symmetrically in the up and down direction with respect to the pixel region 150. The manner of adding parasitic devices at the outside of the pixel region 150 thus becomes substantially identical between the upper and lower sides of the pixel region 150 so that shading due to the effect thereof does not occur. It should be noted that the power supply terminals 7-1 and 7-2 may either be commonly provided within a chip on which the solid-state imaging apparatus is formed or be respectively connected to separate pads so as to be brought to the outside.

The constructional detail of the solid-state imaging apparatus is not limited to what has been shown in the present embodiment, and the construction of the present embodiment can obviously be applied to those solid-state imaging apparatus where an amplifying device is used in pixel and a load device is provided for each column line. Further, the construction of the source follower circuit in the present embodiment has been shown as but not limited to one using a constant-current type load, and it can also be applied to those using a resistor type load to obtain a similar advantage. Furthermore, construction of the horizontal read circuit in the present embodiment has been shown as but not limited to one having the horizontal select MOS transistors, horizontal signal output line, output amplifier and horizontal scanning circuit, and a similar advantage can naturally also be obtained by applying it to those having a horizontal read circuit where for example FPN cancel circuit is internally provided.

As has been described by way of the above embodiments, according to the first aspect of the invention, since the current to be caused to flow through one load means can be reduced to about half as compared to the prior-art example by providing load means for each column line at two opposite locations with the pixel section between, the fall of potential due to parasitic resistance of the vertical signal line becomes half so that it is possible to achieve a solid-state imaging apparatus where vertical shading of the pixel signals can be reduced. According to the second aspect of the invention, since common power supply lines connected in common respectively to the two ends of power supply line provided for each column line are provided at two locations, the effect of parasitic resistance of power supply line provided at each column line can be reduced to about half so that it is possible to achieve a solid-state imaging apparatus where vertical shading of the pixel signals can be reduced. According to the third and fourth aspects of the invention, it is possible to achieve a solid-state imaging apparatus in which vertical shading of the pixel signals can be reduced even in the case where horizontal read circuits are disposed on upper and lower sides of the pixel section. According to the fifth and sixth aspects of the invention, since addition of parasitic devices becomes substantially identical between the upper and lower sides, it is possible to achieve a solid-state imaging apparatus which is not affected by the effect of the parasitic devices produced outside the pixel section.

What is claimed is:

1. A solid-state imaging apparatus comprising:
    a pixel section having a plurality of pixels arranged in a two-dimensional matrix, each containing an amplification means for amplifying signal of a photoelectric conversion device;
    horizontal and vertical read circuits for reading pixel signals of said plurality of pixels from the pixel section; and
    load means for serving as one unit of load on the amplification means of each pixel arranged on each column line, said load means respectively provided at opposite locations of said pixel section for each column line.

2. The solid-state imaging apparatus according to claim 1, further comprising: a plurality of power supply lines for supplying power commonly to the amplification means of each pixel arranged on each column line; and common power supply lines connected in common respectively to the two ends of each power supply line.

3. The solid-state imaging apparatus according to claim 1, wherein said horizontal read circuit is provided respectively in the vicinity of two opposite sides of said pixel section.

4. The solid-state imaging apparatus according to claim 2, wherein said horizontal read circuit is provided respectively in the vicinity of two opposite sides of said pixel section.

5. The solid-state imaging apparatus according to claim 3, wherein said load means and said horizontal read circuits are each placed and laid out substantially symmetrically with at opposite sides of said pixel section between.

6. The solid-state imaging apparatus according to claim 4, wherein said load means, said common power supply lines, and said horizontal read circuits are each placed and laid out substantially symmetrically at opposite sides of said pixel section.

* * * * *